United States Patent [19]

Loth

[11] Patent Number: 5,198,697
[45] Date of Patent: Mar. 30, 1993

[54] DEVICE FOR CONTROLLING THE ELECTRICAL POWER SUPPLY OF A PLURALITY OF ELECTRICAL APPARATUSES FROM A DIRECT CURRENT SOURCE

[75] Inventor: Siri-Yuth Loth, Saint Brice sous Foret, France

[73] Assignees: Automobiles Peugeot, Paris; Automobiles Citroen, Neuilly; Regie Nationale des Usines Renault, Boulogne Billancourt, all of France

[21] Appl. No.: 647,062

[22] Filed: Jan. 29, 1991

[30] Foreign Application Priority Data

Jan. 29, 1990 [FR] France ................. 90 00996

[51] Int. Cl.$^5$ ............................................. H02J 1/00
[52] U.S. Cl. ..................................... 307/31; 307/10.1
[58] Field of Search ................ 307/10.1, 31, 140, 130

[56] References Cited

FOREIGN PATENT DOCUMENTS 2445769 8/1980 France .
2596216 9/1987 France .

Primary Examiner—Jeffrey A. Gaffin
Assistant Examiner—Aditya Krishnan
Attorney, Agent, or Firm—Burns, Doane, Swecker & Mathis

[57] ABSTRACT

Device for the electrical power supply of a plurality of local electrical apparatuses (12) from a single source (1), including a central bistable switch (3) connected between a terminal of the source and the power supply lines (4) of the apparatuses (12) and a central resistor (7) connected in parallel with said central switch (3), each apparatus (12) including a local resistor (8) and at least one control switch (9) in series between its power supply line (4) and the second terminal of the source, each local resistor (8) forming, together with the central resistor (7), a divider bridge connected to a central detector (10) which controls said central switch (3). Each apparatus (12) comprises means for isolating it from its power supply line (4), means for cancelling the current in the local resistor (8) and means for detecting the closure of the central switch (3) which controls the closure of the isolating means and the opening of the current cancelling means when the central switch closes.

10 Claims, 4 Drawing Sheets

DEVICE FOR CONTROLLING THE ELECTRICAL POWER SUPPLY OF A PLURALITY OF ELECTRICAL APPARATUSES FROM A DIRECT CURRENT SOURCE

BACKGROUND OF THE INVENTION

1) Field of the Invention

The present invention relates to a device for the command of the electrical power supply of a plurality of local electrical apparatuses from a single central source of direct current, and more particularly to a central bistable switch connected between a first terminal of said source and the power supply lines of said local electrical apparatuses and a central resistor connected in parallel with said central switch, each local electrical apparatus comprising a local resistor and at least one switch in series, which are connected between its power supply line and the second terminal of said source, each local resistor forming, together with the central resistor, a voltage divider bridge, the center tap of which is connected to a central detector controlling said central switch, each local electrical apparatus supplying to the central detector with information for reopening the power supply central switch. The invention is applied, in particular, to the power supply of the various electrical apparatuses of a motor vehicle from a central power supply unit.

2) Discussion of Related Art

In devices of known type, which are described, for example, in French Patent 2,596,216, the central unit remains in the standby condition and can be activated by the actuation of the local control switch by means of the aforementioned divider bridge, the median voltage of which is detected by the central detector, which "activates" the central unit in the event of a demand expressed by the actuation of a local control switch. This device permits control of the power supply of the local electrical apparatuses only when one of them is used and permits limiting, to a minimum, of the consumption losses when none of the electrical apparatuses is being used. However, in the standby condition, there remains leakage currents circulating through the central resistor and the leakage impedances of said apparatuses.

SUMMARY OF THE INVENTION

The subject of the present invention is a power supply device of the aforementioned type which permits an even further reduction of the leakage currents in the course of the standby condition.

The electrical power supply control device according to the invention is, in particular, characterised in that each local electrical apparatus comprises means for isolating said local apparatus from its power supply line, means for cancelling the current circulating in said local resistor and means for detecting of the closure of the central bistable switch which controls the closure of said isolating means and the opening of said current cancelling means when the central bistable switch closes.

According to an embodiment, in each local electrical apparatus there is provided a local home contact connected in series with said local resistor and said command switch, a local contactor connected in the power supply line downstream of said control switch and local resistor and a local detector connected upstream of said local contactor and controlling said local home contact and local contactor.

On account of the use of the local contactor which in fact controls the power supply of the local apparatus, in the standby condition, there are no longer any leakage currents due to the leakage impedances of said local apparatus; in the manner described hereinabove, the actuation of the command switch involves the closure of the central switch via the central detector; the local detector, reacting to the voltage difference applied to the apparatus, then controls the closure of the local contactor and the opening of the local home contact. This, on the one hand, ensures the power supply of the electrical apparatus and, on the other hand, immediately interrupts the circulation of the current through the local resistor, even if the command switch remains actuated.

BRIEF DESCRIPTION OF THE DRAWINGS

Further features and advantages of the invention will become evident from the description which follows of illustrative embodiments, made with reference to the accompanying drawings, in which.

DETAILED DESCRIPTION OF THE PREFERRED EMBODIMENTS

Figure 1:
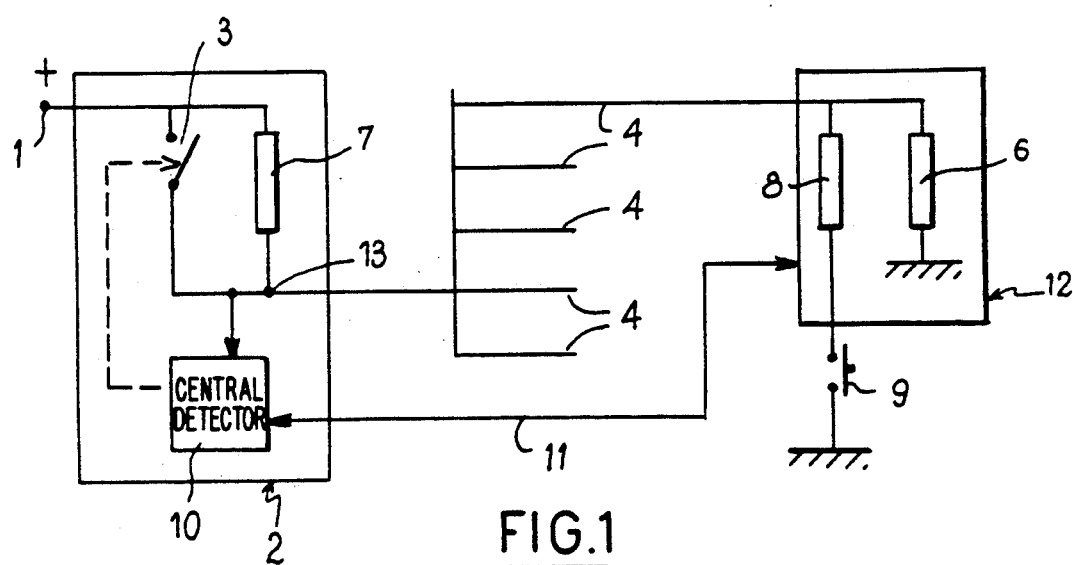
FIG. 1 is the basic diagram of an electrical power supply command device of known type.

FIG. 1 describes a device for the of the electrical power supply of local electrical apparatuses 12 from a central unit 2. The power supply source is a direct current source, the positive pole of which is designated by 1 and the negative pole of which is connected to ground, as is so in the case of the majority of motor vehicles. The central unit 2 comprises a central switch 3, which connects the positive power supply terminal 1 to various power supply lines 4 each supplying a local electrical apparatus 12 such as, in the case of a motor vehicle, a windscreen wiper, an alarm, an electrical window-raising device, etc. The impedance of this electrical apparatus is diagrammatically represented at 6. The switch is closed only when local electrical apparatuses 12 are being used. To this end, there is provided a first central resistor 7 in parallel with the central switch 3 and, in each local electrical apparatus, a local resistor 8 and a local control switch 9 which are connected in series between the power supply line 4 of the apparatus under consideration and ground. A central detector 10 is connected to the median point 13 of the voltage divider constituted by the resistors 7 and 8 detector 10 controls the central switch 3, and receives in addition, via an information line or bus 11, operation information originating from the local electrical apparatus 12.

The control device which has just been described is shown in the standby condition, that is to say that the central switch 3 is open, as is the local command switch 9. When the latter is actuated, by closing the contacts, a current is established through the divider bridge constituted by the resistors 7 and 8 and the voltage variation which results therefrom at the median point 13 is detected by the detector 10, which controls the closure of the central switch 3. When the detector 10 receives, via the bus 11, from the local apparatus an information concerning stoppage of operation of the latter, it controls the reopening of the central switch 3.

In the standby condition shown in FIG. 1, the voltage on the power supply line 4 of each one of the apparatuses is given by the following formula:

$$V1 = \frac{V \times Z}{R7 + Z}$$

in which V is the voltage of the power supply source, Z the impedance of the local electrical apparatus 12 and R7 the value of the resistor 7.

It is seen that, the further the value Z tends towards zero, the further the voltage at the center tap 13 of the divider tends towards zero. This reduces the immunity to parasitic noises on this power supply line. This low value of Z is due, in particular, to the fact that in the case of numerous apparatuses their impedances are all situated in parallel with the power supply lines. It is absolutely necessary to select a value of the resistor 8 which is lower than the aforementioned impedance Z, in order to ensure the activation of the power supply control device. Now, this resistor 8 will have a high current flowing through it when the switch 3 is closed and when there is continued actuation of the local switch 9. The result of this is that the selection of the resistance and of the power of the resistor 8 is very critical.

Figure 2:
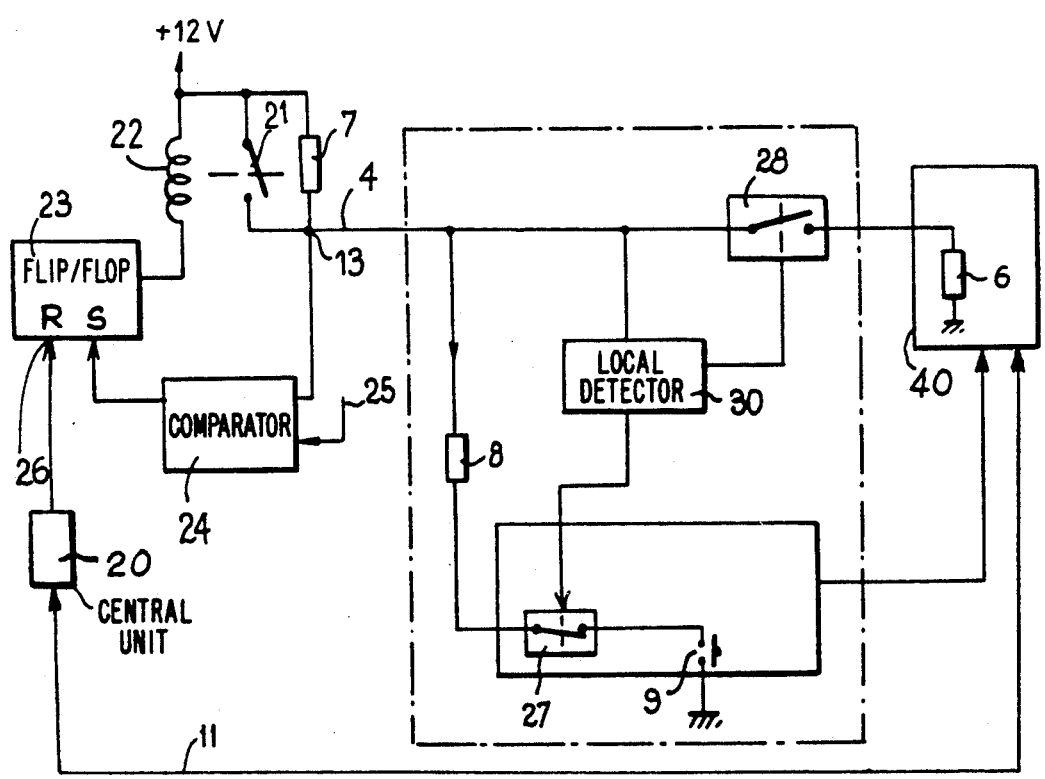
FIG. 2 is the basic diagram of an electrical power supply command device according to the present invention.

FIG. 2 diagramatically illustrates a power supply control device according to the present invention. In this figure, the switch 3 is constituted by the contact 21 of a relay 22 which is commanded by a flip-flop 23 which receives an activation signal supplied by a comparator 24 comparing the voltage at the center point of the divider bridge with a reference voltage supplied at 25. The flip-flop 23 receives on its reset input 26 a return-to-standby signal. This signal is produced by a central unit 20 which receives via the bus 11 operation information originating from the local electrical apparatuses which are being used.

In the local apparatus there are again the command switch 9, the resistor 8 in series and the impedance 6 specific of the apparatus under consideration. According to the invention, there is provided first of all, in series with the resistor 8 and the switch 9, a home contact 27, that is to say a monostable device closed in the inactive position; there is further provided, downstream of the circuit constituted by the resistor 8 and the switch 9, a contactor 28, that is to say a monostable device open in the inactive position; a local detector 30 is connected downstream of the contactor 28.

On account of the presence of the contactor 28, in the standby condition, the impedance 6 of the electrical apparatus 40 under consideration is entirely isolated; consequently, the impedances of the various apparatuses are no longer relevant to the selection of the resistor 8. When the switch 9 is actuated to cause the apparatus 40 to operate, the current is established in the divider bridge constituted by the resistors 7 and 8. As explained hereinabove, this involves the closure of the central switch 21. The result of this is that the voltage of the direct current source is then applied to the power supply line 4 and this is detected by the local detector 30 which acts both on the contactor 28 in order to obtain its closure, involving the power supply of the apparatus 40, and on the home contact 27 which opens, suppressing the consumption in the branch constituted by the resistor 8 and the command switch 9. Even in the event of continuation to close this local command switch 9, the current in the aforementioned branch is interrupted immediately after the activation of the central unit 20. When the flip-flop 23 receives a reset order, the relay 22 is no longer activated and the switch 21 is open. This places the central unit in its standby condition and the local detector 30, no longer receiving the voltage of the power supply source, deactivates the contactor 28 which reverts to its open position and the home contact 27 which reverts to its closed position; the assembly has then reverted to the standby condition.

Figure 3:
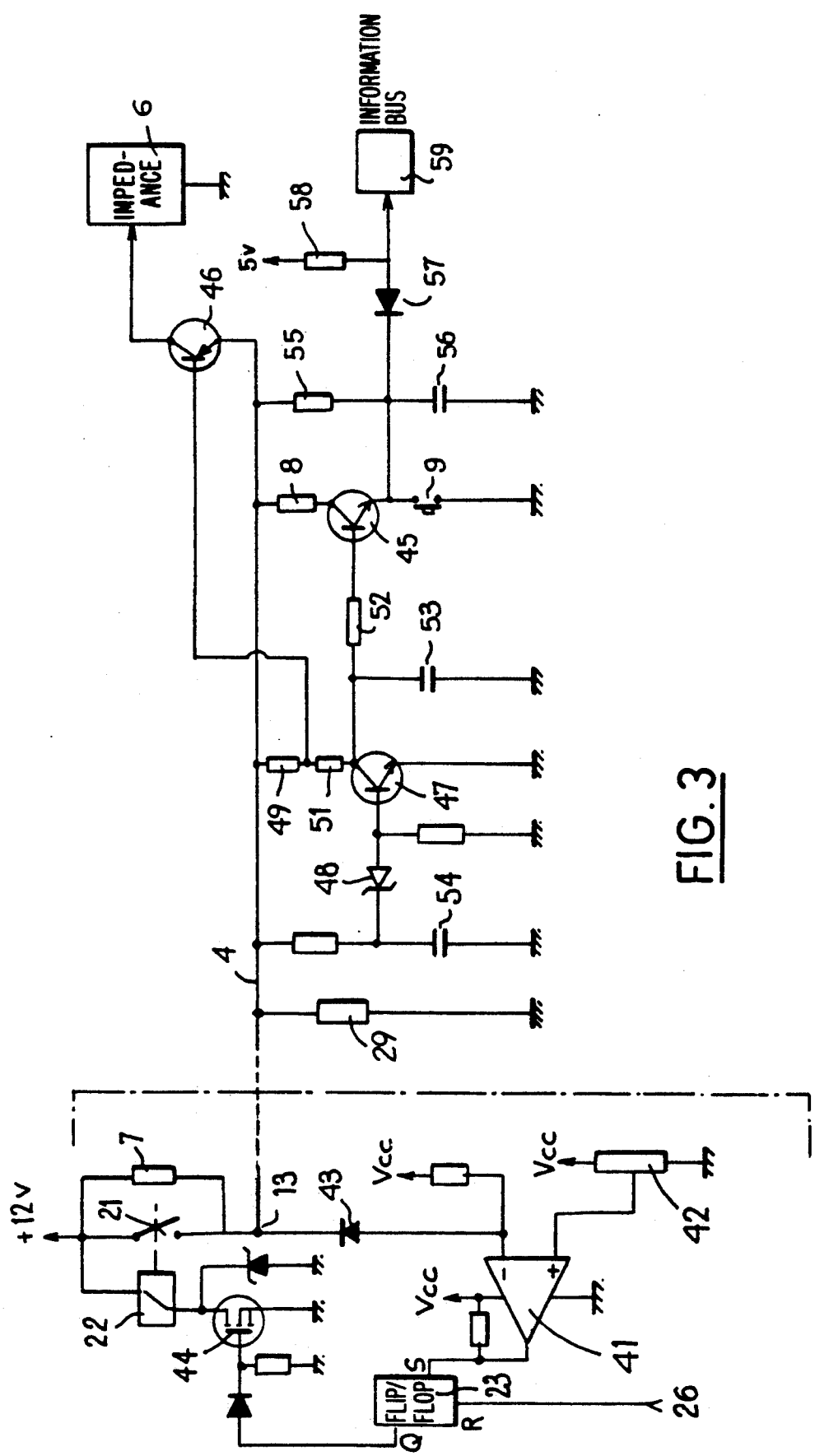
FIG. 3 is a detailed diagram of a first embodiment of the invention.

FIG. 3 represents a practical embodiment of a device according to the present invention. As regards the central unit, it is found that the comparator consists of an operational amplifier 41, the positive input of which receives a reference voltage supplied by a potentiometer 42 and which receives, on its negative input terminal, via a reverse-connected diode 43, the voltage of the central point 13 of the voltage divider constituted by the resistors 7 and 8. The output of the flip-flop 23 commands the relay 22 via a transistor 44, such as a MOSFET. The voltage Vcc applied to the potentiometer 42 may be a stabilized voltage supplied, for example, by a Zener diode or the voltage of the battery protected against voltage surges.

As regards the local electrical apparatus, it is found that the home contact 27 is constituted by an NPN transistor 45 and that the contactor 28 is constituted by a PNP transistor 46. The detector 30 comprises essentially an NPN transistor 47 and a resistor 29 constituting, together with the resistor 7 of the central unit, another divider bridge. The transistor 47 and the resistor 29 are each connected between the line 4 and ground.

The divider bridge constituted by the resistors 7 and 29 supplies, in the standby condition, a voltage V1 which is less than the reverse voltage of a Zener diode 48 connected in the base circuit of the transistor 47, in such a manner as to block this transistor 47 when the arrangement is in the standby condition. The base of the transistor 45 is commanded via resistors 49, 51 and 52 so that this transistor 45 is ready to become saturated when the switch 9 closes. The transistor 46, the base of which is connected to the positive voltage V1, is blocked. This isolates the local apparatus and in particular its impedance 6.

When the switch 9, which may for example be a door relay contact, a headlight signal contact, an horn contact, etc, closes, the transistor 45 is immediately saturated; this brings about a supply of power to the resistor 8 of the divider bridge. The variation of the voltage at the center point 13 is detected by the operational amplifier 41 which acts on the flip-flop 23 to control the power supply to the relay 22; this gives rise to the closure of the switch 21. The resistor 8 may be selected to have a low value, for example 3 Ohms, so that the voltage at the point 13 of the divider falls to a value of almost zero. A capacitor 53 connected between earth and the collector of the transistor 47 was, during the standby, charged to the potential V1 and its discharge through the resistors 49, 51 and 52 will permit the maintaining of the saturation of the transistor 45 and, consequently, to hold the voltage on the line 4 at its low level (for example 0.5 V) during a few hundred microseconds.

When the switch 21 closes, the voltage on the power supply line 4 takes a value close to the voltage of the battery of the vehicle, which is greater than the reverse voltage of the Zener diode 48. This saturates the transistor 47 and, consequently, saturates the transistor 46 and blocks the transistor 45. The local electrical apparatus is then supplied by the voltage of the battery and may therefore operate normally. The high current passing through the resistor 8 of low value and the switch 9 is then interrupted. A capacitor 54 connected between ground and the Zener diode 48 holds the blocking of the transistor 47 at the moment of the closure of the switch 21 in order to cause circulation of a high current, for example 500 mA in 500 microseconds, in the switch 9; this permits the deoxidation of the contacts of this switch.

In order to supply a control information to the central unit, there is provided a resistor 55 connected between the power supply line 4 upstream of the transistor 46 and the emitter of the transistor 45. This permits the circulation of a current in the switch 9, even when the transistor 45 is blocked. The circulation of this current in the switch 9 permits, via a circuit consisting of a capacitor 56 connected in parallel with the switch 9 and of a diode 57, the creation of an information signal from a logic voltage, for example 5 V, applied to a resistor 58, the other terminal of which is connected to the diode 57. The information signal thus obtained at 59 is sent by the information bus to the central station, in particular in order to supply a on-off control signal.

Figure 4:
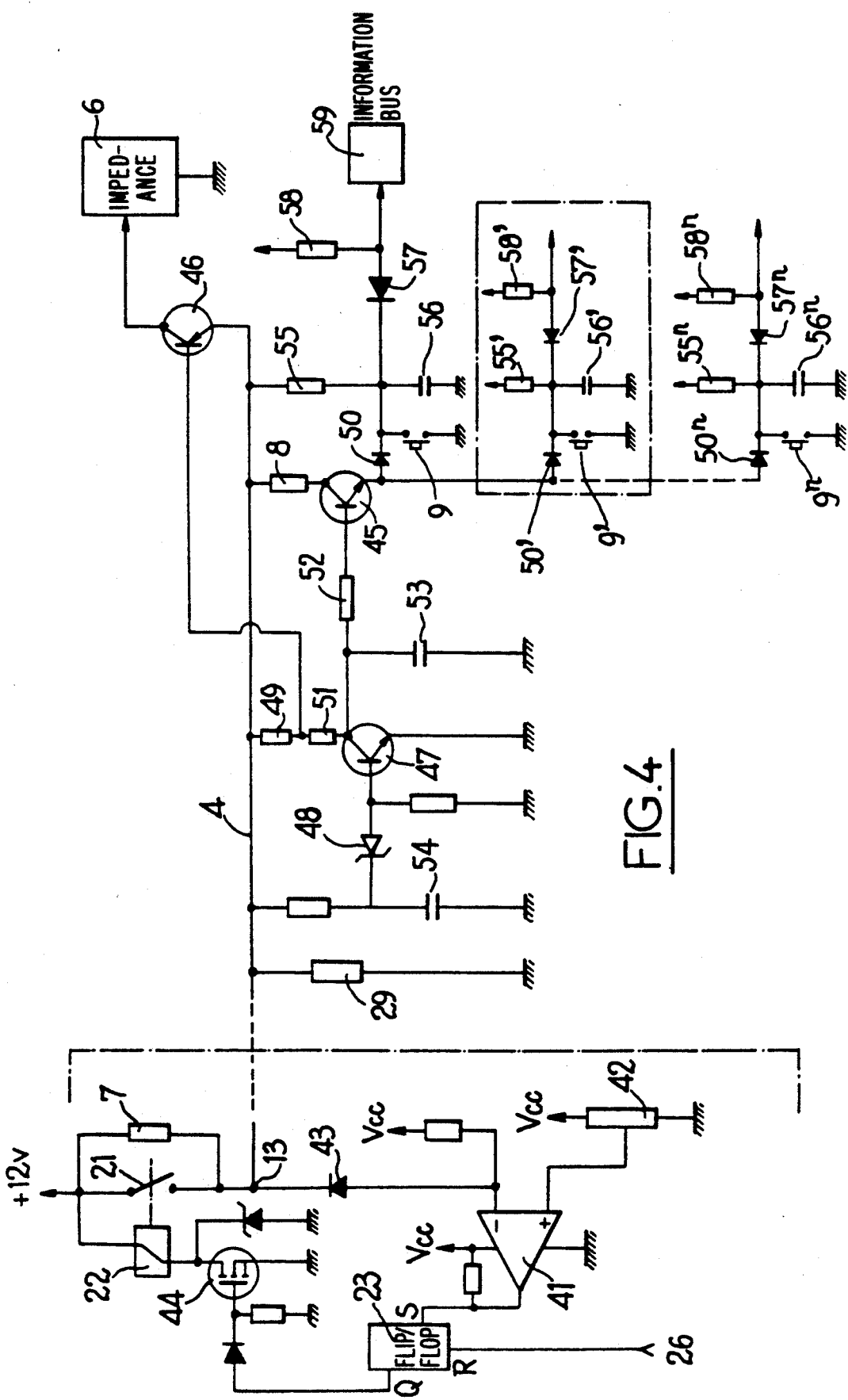
FIG. 4 is a detailed diagram of a modification of the first embodiment.

FIG. 3 represents a device according to the invention which may be used in the case where the local electrical apparatus comprises only a single control switch 9. FIG. 4 represents a modified embodiment which permits the use with a local electrical apparatus comprising a plurality of control switches 9.

In this case, there is provided for each switch 9, 9', . . . , $9^n$ a resistor to maintain the current 55, 55', . . . , $55^n$ and a circuit to form the information signal 56–59, 56'–59', . . . , $56^n$–$59^n$. Moreover, for avoiding that all the circuits for forming an information signal are activated when a single control switch is closed, there is disposed, upstream of each switch 9, between the latter and the emitter of the transistor 45, a diode 50, 50', . . . , $50^n$ which opposes the circulation of the current to ground in the resistors 55, the corresponding control switch of which has not been actuated.

Figure 5:
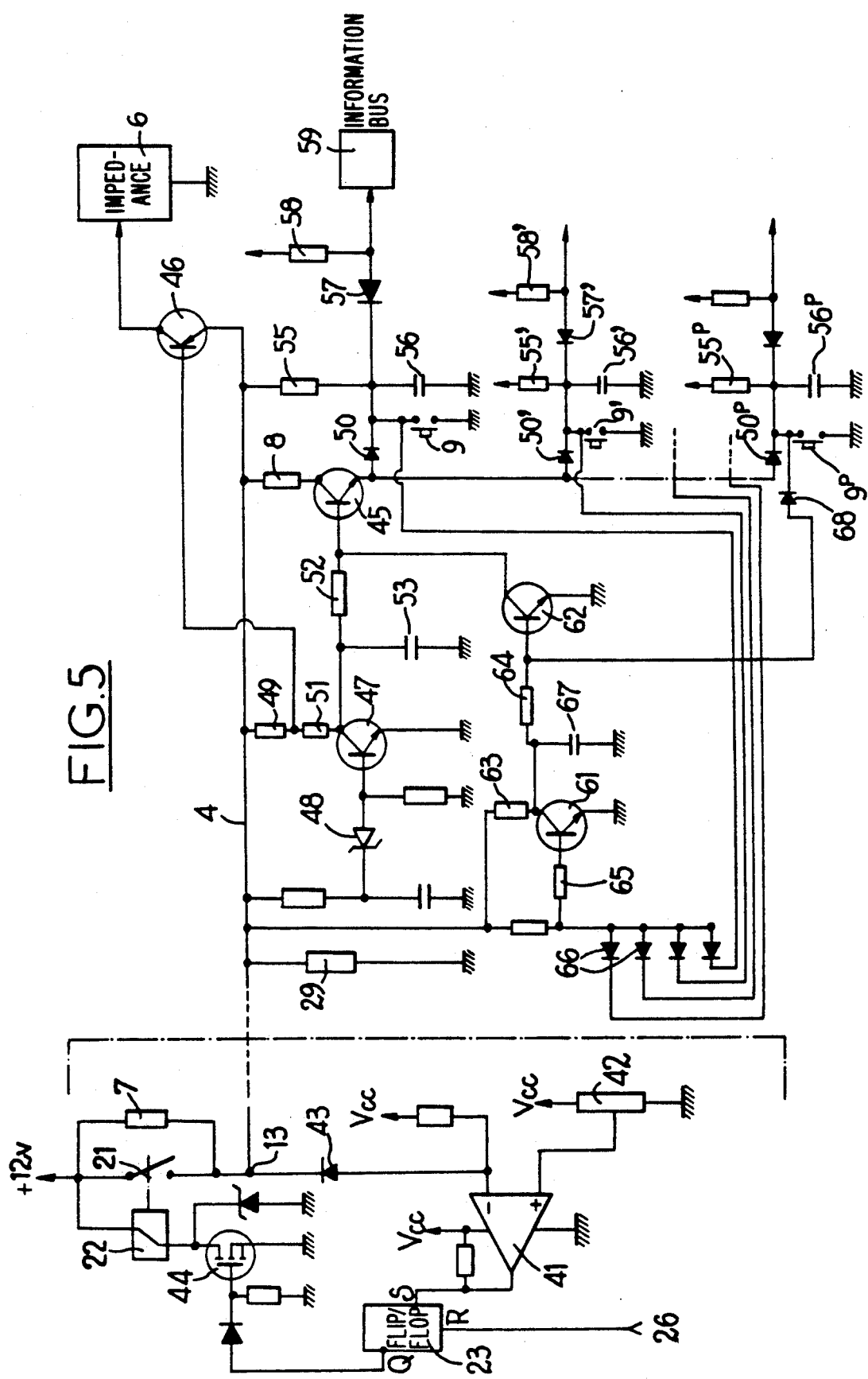
FIG. 5 is a detailed diagram of a modification of the first embodiment including a device for obtaining a stand-by condition.

FIG. 5 represents another modification consisting in introducing into the circuit of FIG. 4 a device permitting the obtaining of the standby condition even if one of the switches of a local apparatus comprising a plurality of control switches remains closed. This permits the suppression of the supply of power to the stations 6 and in particular, by way of example, that of the ceiling light when, the vehicle being in the garage, one of the doors remains open.

This device essentially comprises two NPN transistors 61 and 62; the first transistor 61 is connected in series with a resistor 63 between the line 4 and earth; the collector of this transistor 61 control, via a resistor 64, the base of the transistor 62, the emitter of which is connected to earth and the collector to the base of the transistor 45. The base of the transistor 61 is connected to a resistor 65 which is itself connected, via a diode 66, to the upstream contact of each one of the local switches 9 to $9^n$ under consideration, that is to say to the emitter of the transistor 45, via diodes 50 to $50^n$.

It is noted that, when one or more of the switches under consideration is closed, during the activation phase, the transistor 61 is blocked and saturates the transistor 62, which itself blocks the transistor 45.

In the course of placing in the standby condition, the transistor 47 becomes blocked, but it cannot ensure the saturation of the transistor 45 which remains blocked by the transistor 62. The result of this is that the line 4 is completely disconnected, in spite of the grounding by the various switches which are connected to the transistor 61. The switches may for example be constituted by the door relay contacts of a motor vehicle.

In order to be able to activate the device, it is necessary first of all that all the local switches 9 to $9^n$ under consideration are open; then, one of these switches is closed. In fact, when all the switches under consideration are open, the transistor 61 becomes saturated and blocks the transistor 62 which, in its turn, allows the transistor 45 to become saturated, when a switch 9 under consideration is closed, the transistor 45 resets the line 4 to zero potential and then blocks the transistor 61. As this transistor 61 is blocked, the capacitor 67 which is connected in parallel to the emitter and the collector of the transistor 61 is charged through the resistor 63 with a time constant which corresponds to the product RC of the capacitor 67 and of the resistor 63. When this charging is completed, the transistor 62 is saturated this gives rise to the blocking of the transistor 45 and the cycle may be repeated in this manner.

This leads to the creation of a circuit for blocking the local circuit breaker 45, this blocking circuit being controlled by the voltage at the terminals of each one of the control switches 9, 9', . . . , $9^n$.

In this embodiment, it is possible to provide a special circuit for a priority local switch, for example a local switch for controlling the emergency hazard signal; this switch $9^P$ is connected directly, via a diode 68, to the base of the transistor 62. The result is that the closing of this switch $9^P$ blocks the transistor 62 which, in its turn, allows the transistor 45 to become saturated.

This leads to the creation of a priority control circuit for the switch $9^P$, this being a circuit which acts on the transistor 45 via the transistor 62.

I claim:

1. Device for control of electrical power supply to a plurality of local electrical apparatuses from a single source of direct current, comprising a central bistable switch connected between a first terminal of said source and power supply lines of the local electrical apparatuses;

a central resistor connected in parallel with said central switch;

each local electrical apparatus comprising a local resistor and at least one control switch which are connected in series between a power supply line and a second terminal of said source, each local resistor forming, together with the central resistor, a voltage divider bridge, a center point of which is connected to a central detector controlling said central switch, each local electrical apparatus generating a reopening information signal which is sent to the central detector, means for eliminating the current circulating in said local resistor and means for detecting the closure of the central bistable switch which controls the closure of said isolating means and the opening of said current eliminating means when the central bistable switch closes.

2. The device according to claim 1, wherein in each local electrical apparatus, there is provided a local home contact connected in series with said local resistor and said control switch, a local contactor connected to the power supply line downstream of said control switch and local resistor and a local detector connected upstream of said local contactor and controlling said local home contact and local contactor.

3. The device according claim 2, wherein the central switch includes a relay controlled by a flip-flop, and the central detector includes a comparator.

4. The device according to claim 2 or 3, wherein the local home contact and the local contactor include transistors.

5. The device according to claim 1, further comprising, connected in parallel with each control switch, a circuit for generating an operation signal, said operation signal being transmitted by an information bus to a central unit.

6. The device according to claim 1, wherein the local detector comprises a transistor and a resistor which are each connected between the power supply line and the second terminal of the direct current source.

7. The device according to claim 6, wherein the local electrical apparatus comprises a plurality of control switches and a diode inserted between the local home contact and each of said control switches.

8. The device according to claim 7, wherein each local electrical apparatus comprises a circuit for blocking the local circuit breaker controlled by the voltage at the terminals of each one of the control switches.

9. The device according to claim 8, wherein said blocking device comprises two transistor stages and controls the base of a transistor constituted the local home contact.

10. The device according to claim 9, wherein a transistor of the second stage of said blocking device is controlled by a priority control circuit including a diode connecting the base of the transistor to the upstream terminal of a control switch.

* * * * *